(12) United States Patent
Koenig et al.

(10) Patent No.: US 9,422,967 B2
(45) Date of Patent: Aug. 23, 2016

(54) EXCHANGEABLE WHEEL STUD

(71) Applicants: Paul-Uwe Koenig, Bergisch Gladbach (DE); Gerd Bruessler, Bergisch Gladbach (DE); Michael Bartel, Köln (DE); Hubertus von Chappuis, Bedburg (DE)

(72) Inventors: Paul-Uwe Koenig, Bergisch Gladbach (DE); Gerd Bruessler, Bergisch Gladbach (DE); Michael Bartel, Köln (DE); Hubertus von Chappuis, Bedburg (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 105 days.

(21) Appl. No.: 13/651,438

(22) Filed: Oct. 14, 2012

(65) Prior Publication Data

US 2014/0105706 A1    Apr. 17, 2014

(51) Int. Cl.
*F16B 35/04* (2006.01)
*F16B 5/02* (2006.01)

(52) U.S. Cl.
CPC ............. *F16B 35/041* (2013.01); *F16B 5/0275* (2013.01); *F16B 35/042* (2013.01)

(58) Field of Classification Search
CPC ...... F16B 37/044; F16B 37/122; F16B 37/04; F16B 37/042; F16B 35/042; F16B 25/00; F16B 25/0057; F16B 25/0015; F16B 35/04; F16B 5/0275; F16B 25/047; B23P 9/025; B60B 3/16; B60B 3/008; B60B 1/06; B60B 3/044; B60B 3/145
USPC .............. 411/108, 389, 413, 388; 301/35.621
See application file for complete search history.

(56) References Cited

U.S. PATENT DOCUMENTS

| 1,321,967 | A | * | 11/1919 | Woodward | B60B 3/16 301/35.54 |
|---|---|---|---|---|---|
| 1,563,059 | A | * | 11/1925 | Acker | B60B 3/16 301/35.623 |
| 1,908,024 | A | * | 5/1933 | Keller | B60B 3/14 188/218 R |
| 1,939,769 | A | * | 12/1933 | Eksergian | B60B 3/16 301/35.625 |
| 1,974,746 | A | * | 9/1934 | Kuhnen | B60B 3/16 301/35.623 |
| 2,107,925 | A | * | 2/1938 | Ash | B60B 3/16 301/35.621 |
| 2,161,740 | A | * | 6/1939 | Eksergian | B60B 11/06 301/35.622 |
| 2,897,112 | A | * | 7/1959 | Vernon | A01N 53/00 514/72 |
| 3,455,198 | A | * | 7/1969 | Barrett | 411/388 |
| 3,494,669 | A | * | 2/1970 | Reppert | B60B 3/14 301/35.629 |
| 3,841,768 | A | * | 10/1974 | Adams | 403/3 |
| 3,897,112 | A | * | 7/1975 | Walther | B60B 23/10 301/11.1 |
| 3,897,713 | A | * | 8/1975 | Gugle | 411/389 |
| 4,186,645 | A | * | 2/1980 | Zaydel | 411/55 |

(Continued)

FOREIGN PATENT DOCUMENTS

DE          20200213 U    3/2002
DE       102004050625 A    4/2006

(Continued)

*Primary Examiner* — Gary Estremsky
(74) *Attorney, Agent, or Firm* — Joseph E. Root

(57) ABSTRACT

A wheel stud includes a fixing segment, which has a first external thread, and a receiving segment, which has a second external thread. Here, the first external thread runs opposite in direction to the second external thread. More particularly, the wheel stud is configured to be connected to a wheel hub through the fixing segment, where the wheel hub includes at least one receiver bore having an internal thread corresponding to the first external thread.

3 Claims, 2 Drawing Sheets

(56) References Cited

U.S. PATENT DOCUMENTS

| | | | | |
|---|---|---|---|---|
| 4,304,503 A | * | 12/1981 | Gehring | F16B 35/04 29/525.04 |
| 5,205,692 A | * | 4/1993 | Kelbert et al. | 411/173 |
| 5,312,005 A | * | 5/1994 | Odell | 411/389 |
| 5,645,386 A | * | 7/1997 | Damm | B60B 3/16 411/399 |
| 5,779,416 A | * | 7/1998 | Sternitzky | F16B 31/06 411/411 |
| 6,341,917 B1 | * | 1/2002 | Schubring et al. | 403/296 |
| 6,575,536 B2 | * | 6/2003 | Chen | B60B 3/145 301/35.54 |
| 6,672,791 B2 | * | 1/2004 | Schubring et al. | 403/296 |
| 2014/0205396 A1 | * | 7/2014 | Schermer | 411/427 |

FOREIGN PATENT DOCUMENTS

| | | |
|---|---|---|
| DE | 102009050944 A | 5/2010 |
| DE | 102008051601 A | 6/2010 |

* cited by examiner

EXCHANGEABLE WHEEL STUD

BACKGROUND

This application generally relates to the field of mounting wheels to vehicle wheel hubs, and, more particularly, relates to the field of modular wheel mounting systems.

Conventionally, wheel studs enable mounting a wheel to a wheel hub. The studs are inserted and connected to the hub from the inside, into a series of receiver bores, during manufacturing and/or assembly. The components are dimensioned to produce a press-fit between the wheel hub and the studs, affixing the studs non-rotatably and securely to the wheel hub. Non-rotatable mountings, such as these, protect against pulling and twisting forces resulting in a subsequent dislocation of the studs, and may thus form a counter-bearing mechanism as well.

Damage to an assembly of this nature may require removal of the wheel stud. After installation, however, the stud can only be released with considerable effort, employing tools such as a hammer. Additionally, restricted working makes removing the wheel stud a relatively tedious task, involving removal and exchange of both the wheel hub and its bearings. This task requires a substantial amount of time and effort.

One solution proposed in the art employs impact tools to release the wheel stud. The resulting blows to the face of the wheel stud transfers impact energy directly to the wheel bearing, which can produce damage to that component.

Thus, there remains a need for an improved method to accomplish assembly and disassembly of a vehicle wheel hub manufacturing, service, and repair.

SUMMARY

One embodiment of the present application describes a wheel stud including a fixing segment having a first external thread and a receiving segment including a second external thread. Here, the first external thread runs opposite in direction to the second external thread. Moreover, the wheel stud is configured to be connected to a wheel hub through the fixing segment. Further, the wheel hub includes at least one receiver bore, which has an internal thread corresponding to the first external thread.

Another embodiment of the present disclosure describes a wheel mounting system, which includes a wheel stud configured to guide a mounting of a wheel to a wheel hub. A fixing segment on the wheel stud includes a first external thread, while a receiving segment on the wheel stud includes a second external thread. Here, the wheel stud is configured to be connected to the wheel hub through the fixing segment, having the first external thread run in an opposite direction to the second external thread. Further, the wheel hub includes at least one receiver bore, which includes an internal thread corresponding to the first external thread. Furthermore, the system includes a stop element, including a key surface, arranged in between the fixing segment and the receiving segment.

Certain embodiments of the present disclosure describe a method of assembling a wheel stud to a wheel hub, wherein the wheel stud enables mounting of a wheel to the wheel hub. The method includes connecting the wheel stud to the wheel hub through a threaded connection disposed between the wheel stud and wheel hub. More particularly, the threaded connection includes a fixing segment on the wheel stud, which in turn includes a first external thread, along with a receiving segment on the wheel stud, which includes a second external thread. Moreover, the wheel stud is configured to be connected to the wheel hub through the fixing segment, where the first external thread runs opposite in direction to the second external thread. In addition, the wheel hub includes at least one receiver bore including an internal thread corresponding to the first external thread.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and systems for mounting a wheel to a wheel hub through an exchangeable wheel stud. To this end, the wheel stud includes a fixing segment and a receiving segment, with both segments including a first external thread and a second external thread, where, more particularly, the wheel stud connects to the wheel hub through the first external thread disposed on the fixing segment. Thereafter, the wheel is mounted to the wheel hub in a conventional manner, through the receiving segment of the wheel stud.

Exemplary Embodiments

Figure 1:
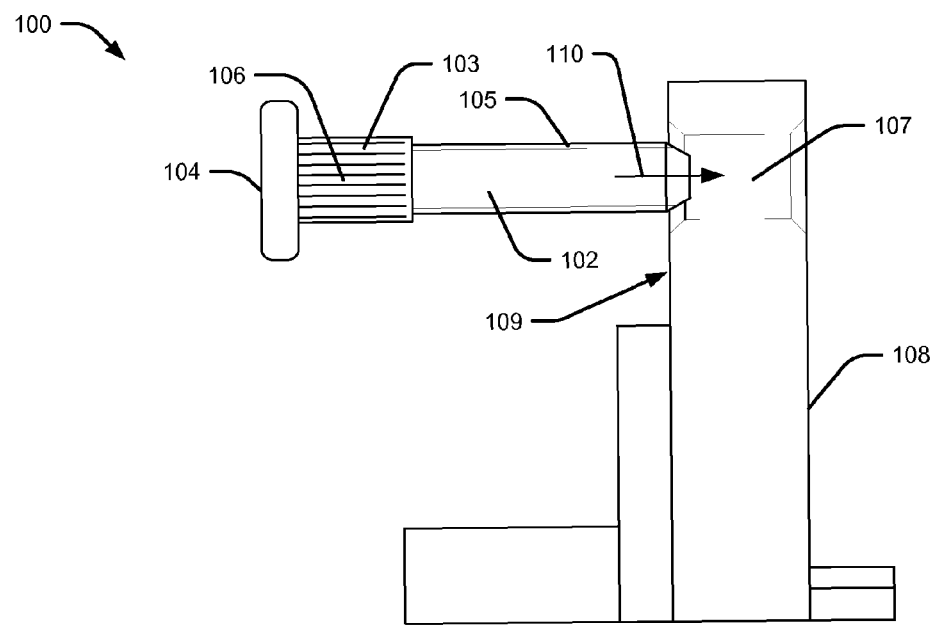
FIG. 1 depicts a conventional wheel stud assembled within a conventional wheel hub.

FIG. 1 is a conventionally applied wheel stud 100, showing the stud being inserted into a receiver bore 107 in wheel hub 108. The wheel stud 100 includes a receiving segment 102 and a fixing segment 103. At a free end of the fixing segment 103, the wheel stud 100 has a stud head 104, which is widened in the manner of a flange. The receiving segment 102 carries a second external thread 105 (a first external thread is discussed later). Likewise, the fixing segment 103 also carries serrations, such as teeth 106, running parallel to the stud's longitudinal axis, while being peripherally disposed in relation to the corresponding circumferential direction.

Conventionally, the wheel stud 100 is first pushed or pressed in the direction of arrow 110 from the relative inside of the vehicle to the outside, so that receiving segment 102 enters the receiver bore 107 of the wheel hub 108. The wheel stud 100 continues until its stud head 104 abuts against the inside region 109 of the wheel hub 108. Stud head 104 thus acts as a counter bearing mechanism and limits the inward travel of the wheel stud 100. The wheel stud 100 is connected to the wheel hub 108 securely, at least partly through the action of teeth 106.

Moreover, teeth 106 limit the twisting, rotation, and movement of the wheel stud 100. More particularly, teeth 106 increase the contact forces and adhesion between the receiver bore 107 and the wheel stud 100. Such fixed wheel stud 100 serves as a mounting aid when assembling a wheel to the wheel hub 108. A wheel nut (not shown) can be screwed onto the second external thread 105 of the receiving segment 102, to guide and attach a wheel (not shown). It is also understood that a substantial amount of space would generally be required on the inside region 109 of the wheel hub 108, to correspond at least according to the length of the wheel stud 100, to perform an appropriate insertion and subsequent connection of the wheel stud 100 to the wheel hub 108.

Changes and removal of the wheel stud 100 however, may be required. For example, if the second external thread 105 is damaged, such that a wheel nut can no longer be screwed properly, then the entire wheel stud must be extracted from wheel hub 108.

Conventionally, as noted above, the wheel stud 100 is inserted according to the joining direction 110 from the inside region 109 into the wheel hub 108 or the receiver bore 107. To release the wheel stud 100 however, the wheel stud 100 must be extracted against the joining direction 110, which can only be achieved with substantial effort. In addition, a special tool may be required. In addition, removal of even a single wheel stud 100, because of the restricted spatial conditions, is usually achieved with the removal of surrounding components, such as a corresponding bearing unit. It is also conceivable that the entire assembly may require removal, which may consume considerable effort and time.

Figure 2:
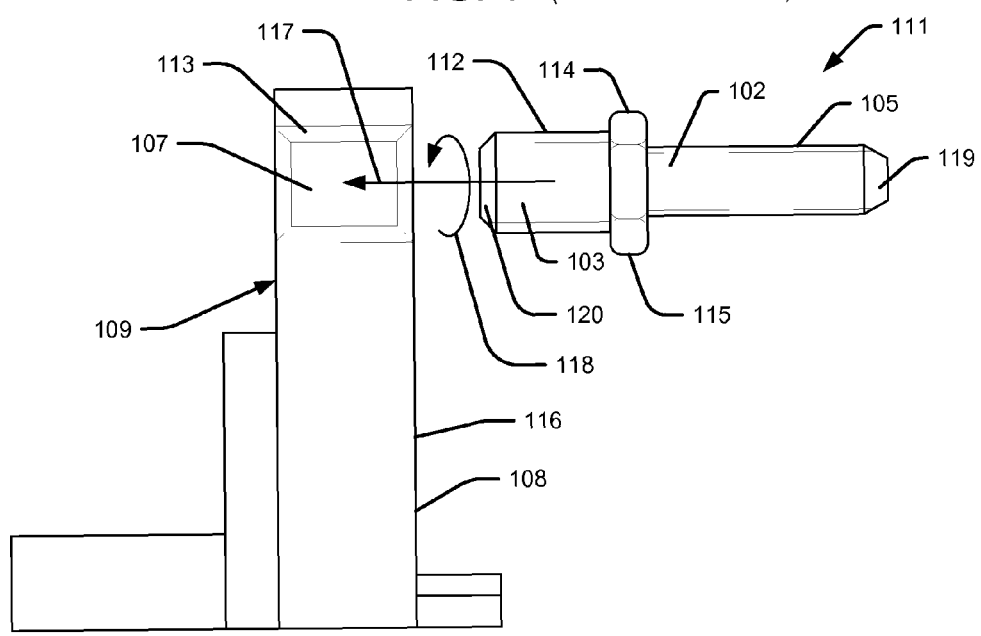
FIG. 2 illustrates an exemplary wheel stud according to the aspects of the present disclosure.

Contrary to conventional structure of FIG. 1, FIG. 2 depicts a wheel stud 111, which can be removably or exchangeably connected to a conventional wheel hub, such as hub 108, and the corresponding connection may be enabled through a threaded connection disposed between the wheel stud 111 and wheel hub 108. The threaded connection according to the present disclosure thus includes the fixing segment 103, conventionally forming a region for the wheel stud's mounting to the wheel hub 108, including a first external thread 112, which threadably attaches the wheel stud 111 to the wheel hub 108. First external thread 112 mates with an internal thread 113, disposed within receiver bore 107 formed in wheel hub 108. Thus, the engagement of the two threads 112 and 113 connects of the wheel stud 111 to the wheel hub 108 suitably and appropriately. Further, the threaded connection allows the wheel stud 111 to have the receiving segment 102 protruding from the wheel hub 108 upon an assembly of the wheel stud 111 to the wheel hub 108. This arrangement enables a wheel to be guided over the receiving segment 102, for mounting the wheel on the wheel hub 108. In general, multiple wheel studs 111 are provided, generally four or five, depending on the wheel design. To reliably attach a wheel, the wheel is fitted over the wheel studs 111 and then wheel nuts (not shown), as known in the art, are screwed onto the wheel studs 111.

Figure 3:
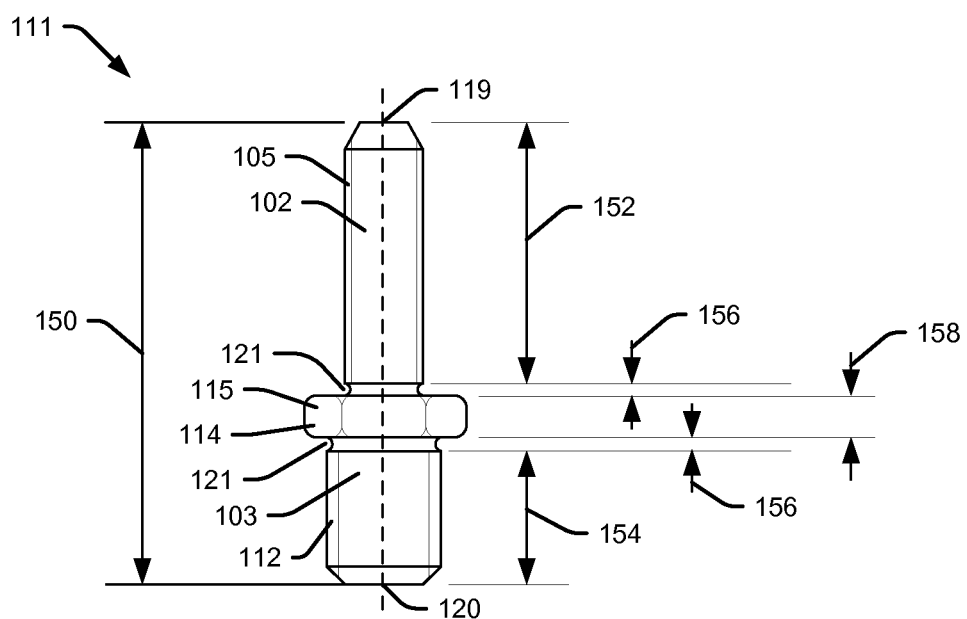
FIG. 3 is a detailed view of the exemplary wheel stud of FIG. 2.

As can be seen in FIG. 2 and FIG. 3 the first external thread 112 and second external thread 105 run in opposite directions. As a result, removing a wheel nut (not shown) from wheel stud 111 requires rotation in an opposite direction from removing the wheel stud 111 from the wheel hub 108. That arrangement minimizes the possibility of both of those elements rotating loose as a result of vehicle vibration. Further, the internal thread 113 discussed above may already be present, or can be machined, cut, or molded, directly during production of the first screw connection (for example by employing a self-tapping thread).

In a preferred embodiment, the wheel stud 111 includes a right-hand thread as the second external thread 105, while the first external thread 112 of the fixing segment 103 includes a left-hand thread. In contrast, it is well understood, that a left-hand thread may also be arranged on the receiving segment 102, which would however imply a right-hand thread to be arranged on the fixing segment 103. Because of such an arrangement of opposing threads 105 and 112 on the wheel stud 111, the fixing segment 103 remains fixed in the wheel hub 108 when a related wheel nut on the receiving segment 102 is released or loosened. If the wheel nut is screwed onto the receiving segment 102, other measures, which are not described here, may counter the release of the fixing segment 103 from the hub 108.

A stop element 114 lies between the fixing segment 103 and the receiving segment 102. The stop element 114 has a greater diameter than either receiving segment 102 or fixing segment 103, and it carries a key surface 115 on its outer periphery. The key surface 115 may be formed as a hexagon, so that a conventional turning tool, e.g. a ring, an open-ended wrench, or simply pliers, can grip that surface to generate a maximum tightening moment. Embodiments may call for the key surface 115 and the related turning tool to include varied shapes and configurations, as are well known in the art.

In preferred embodiments, the stop element 114 may be arranged to define a maximum screw-in depth of the fixing segment 103 in the receiver bore 107. Here, the maximum screw-in depth can be selected preferably in accordance with the maximum tightening moment and release moment of the wheel stud 111, such that the free end 120 of the fixing segment 103 terminates flush with the inside region 109 of the wheel hub 108. Further, the free end 120, not protruding beyond the longitudinal extents of the receiver bore 107, towards the inside region 109, is particularly advantageous when spatial conditions are limited. Moreover, the free end 120 of the fixing segment 103 can also be arranged within the receiver bore 107. As a further advantage, the stud head 104 (shown in FIG. 1), which was previously required for the wheel stud 100, may be omitted as well.

Structurally, the two external threads 105 and 112 can be guided on their respective segments 102 and 103, as far as the stop element 114, where, more explicitly, the external threads 105 and 112 lead from the respective free ends 119 and 120, of the segments 102 and 103 all the way to the stop element 114. Further, a thread-free region is provided preferably at both the free end 119 of the receiving segment 102, and of the free end 120 of the fixing segment 103.

The wheel stud 111 can thus be screwed onto the wheel hub 108 from an outside region 116 into the receiver bore 107. Where applicable, a turning tool may simply engage the key surface 115 to accomplish this. A corresponding joining direction, axially disposed to the wheel stud 111, is indicated by means of an arrow 117, where a required rotation of the wheel stud 111 is shown by means of the rotation arrow 118.

If the wheel stud 111 with its fixing segment 103 is screwed to the receiver bore 107, a virtually force-fit and form-fit connection is achieved which cannot be released against the axial joining direction 117 without destroying one or both connection threads, 112, 113. The connection, however, can be deliberately released if a targeted rotation direction is applied and the release moment is overcome.

In further detail, and as can be seen and understood from FIG. 2 and FIG. 3, the fixing segment 103 has a greater diameter than the receiving segment 102. Such a structure may however relate to the conventionally styled wheel studs as well.

When the wheel stud 111 is screwed into the wheel hub 108, the stop element 114, with key surface 115, lies on the outside region 116 of the wheel hub 108. Thus, the receiving segment 102 may protrude from the wheel hub 108, so that a wheel can be mounted on the wheel hub 108 in a known manner. Generally, several wheel studs 111 are required, three, four or five being common arrangements. A mounting wheel with a single wheel stud 111 may also conceivable.

In the exemplary embodiment of FIG. 3, a ring groove 121 is arranged on each of the segments 102 and 103, between the threads 105 and 112, and the stop element 114. In detail, the ring groove 121 is cut into the stud's shaft directly adjacent the stop element 114, so that the respective external threads 105 and 112 are guided in each case only up to the ring groove 121.

In another embodiment, a design of the first external thread 112 of the fixing segment 103 may include a pitch different from the pitch of the second external thread 105. Accordingly, the thread pitch in the fixing segment 103 can be smaller than or equal to the thread pitch in the receiving segment 102. If the fixing segment 103 has a larger diameter than the receiving segment 102, the thread pitch of the fixing segment 103 can also be larger than that of the receiving segment 102. According to the aspects of the present disclosure, it may be preferred that the thread pitch of the receiving segment 102 remains smaller than or equal to the thread pitch of the fixing segment 103. The particular design, however, could vary from application to application. A difference in the pitch of the fixing segment 103 and the receiving segment 102 ensures that the wheel stud 111 remains fixed to the wheel hub 108, particularly during an operation such as assembling or disassembling a corresponding wheel nut.

These measures alone or in combination are selected so that the required torque to release the wheel stud 111 from the wheel hub 108 is greater than the maximum thread friction moment of the wheel nut. An undesirable release of the wheel stud 111 from the wheel hub 108 is thus avoided, when the wheel nut is screwed onto the receiving segment 102. The wheel stud 111 thus always remains on the wheel hub 108 when desired. If the wheel stud 111 is to be released because, for example, the second external thread 105 on the receiving segment 102 is destroyed, the key surface 115 of the stop element 114 can be used to unscrew the wheel stud 111 from the hub 108. A further advantage of the disclosure lies in that a conventional wrench may be sufficient for a release, avoiding removal of the entire wheel hub 108. This result is made possible because the wheel stud 111 is advantageously removed towards the outside region 116 and not towards the inside region 109.

In some embodiments, assuring a secure mounting of the wheel stud 111 to the wheel hub 108 when a related and assembled wheel nut is loosened from the wheel stud 111 may include the application of a torque wrench during the wheel nut's assembly. A torque wrench may indicate the wheel stud 111 to be tightened to a higher value than to the value to which the wheel nut requires to be tightened. This may be enabled so that an assembly/disassembly process of the wheel nut does not unscrew and loosen the wheel stud 111 accidently.

Further to the structure of the wheel stud 111 as depicted in FIG. 3, the fixing segment 103 can have an axial length 154, which can correspond to approximately half the axial length 152 of the receiving segment 102. The stop element 114 can have a thickness 158, corresponding approximately to 15% of the total wheel stud length 150, where the thickness 158 can be set to a fixed amount, such as 0.8 mm. The respective ring groove 121 can have an axial extent 156 of around 4% of the total stud length 150, or can be set constantly to a fixed amount of, e.g., 2 mm. Further, the first external thread 112 of the fixing segment 103 can be designed as an M14*1.5 left-hand thread, where the second external thread 105 of the receiving segment 102 can be designed as M12*1.5 right-hand thread. Furthermore, the stop element 114 can be designed with the key surface 115, corresponding to a Torx turning tool, or as a hexagon with key width SW 19. Accordingly, deviations or changes may also be made to the above noted ratios or amounts, which are herein provided as examples. As a further example, the stud length 150 of the wheel stud 111 can have an amount of 52 mm. Correspondingly, the fixing segment 103 would have an amount of 14 mm and the receiving segment 102 an amount of 30 mm. The respective ring groove 121 would thus have an amount of 2 mm, and accordingly, the stop element 114 would have a thickness of 8 mm. The stud length 150 may be understood to be the sum of the respective segment lengths 154 and 152 plus the amount of the thickness 158 of the stop element 114.

The proportional relation noted above between the different portions of the wheel stud 111 may vary from practice to practice and application to application. Thus, that relation need not be viewed as limiting the aspects of the disclosure in any way.

For removing a mounted wheel, the wheel stud 111 may be unscrewed from the connection by engaging the stop element 114 through a simple, widely available turning tool. A damaging impact action caused, for example, through a hammer or a similar tool for release, is thus advantageously avoided. Moreover, damage to the wheel bearing is prevented as well, which is notable by an incorrect use of the hammer, or similar tools. Thus, the wheel bearings may have a longer life.

Furthermore, the present disclosure is not restricted to the wheel stud 111 alone. Rather the disclosure discloses a generic screw stud, designed according to the disclosure, having two opposing threads, with differing pitches and diameters, while being disposed over the same stud shaft. To this end, the exemplary embodiment described of fixing a wheel through the wheel stud 111 should be regarded as preferred, but merely as an example.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed disclosure is defined solely by the claims set out below.

We claim:

1. A wheel mounting system comprising:
a wheel hub, including a plurality of receiver bores adapted to match a plurality of mounting apertures on an automotive wheel, each receiver bore having an internal thread, the wheel hub having an outside region and an inside region;
a plurality of wheel studs, each wheel stud being adapted to engage a mounting aperture, and each wheel stud including;
a fixing segment including a first external thread, the first external thread being adapted to threadably engage a receiver bore internal thread from the outside region of the wheel hub; and
a receiving segment including
a second external thread, the second external thread running in a direction opposite to the direction of the first external thread, and
the receiving segment having a diameter less than the diameter of the fixing segment; and
a stop element positioned between the fixing segment and the receiving segment, the stop element including a key surface;

wherein
- the key surface is accessible from the outside region of the wheel hub;
- each of the first and the second external threads extends all across an entire longitudinal length of the fixing segment and the receiving segment, respectively, till the stop element; and
- the first external thread has a pitch which differs from the pitch of the second external thread.

2. The system of claim 1, wherein the first external thread is a left-hand thread and the second external thread is a right-hand thread.

3. The system of claim 1, wherein the first external thread and the second external thread are each guided by a free end up to the stop element arranged between the two segments.

* * * * *